United States Patent [19]

Heller et al.

[11] Patent Number: 5,441,646
[45] Date of Patent: Aug. 15, 1995

[54] PROCESS OF REMOVING SULFATE IONS FROM WATER WITH A POLY(METH)ACRYLAMIDE EXCHANGE RESIN

[75] Inventors: Harold Heller, Köln; Franz-Rudolf Minz, Dormagen; Reinhold M. Klipper, Köln; Alfred Mitschker, Odenthal-Holz; Heiko Hoffmann, Bergisch Gladbach, all of Germany

[73] Assignee: Bayer Aktiengesellschaft, Leverkusen, Germany

[21] Appl. No.: 277,383

[22] Filed: Jul. 19, 1994

Related U.S. Application Data

[63] Continuation of Ser. No. 931,165, Aug. 17, 1992, abandoned.

[30] Foreign Application Priority Data

Aug. 22, 1991 [DE] Germany ............... 41 27 861.5

[51] Int. Cl.$^6$ ............... C02F 1/42; B01J 41/04; B01J 41/12; C08F 8/32
[52] U.S. Cl. ............... 210/683; 210/660; 210/681; 521/32; 525/381; 525/382
[58] Field of Search ............... 210/660, 683; 521/32

[56] References Cited

U.S. PATENT DOCUMENTS

| | | |
|---|---|---|
| 2,582,194 | 1/1952 | Dudley . |
| 2,675,359 | 4/1954 | Schneider ............... 521/32 |
| 3,842,002 | 10/1974 | Boari . |
| 4,556,463 | 12/1985 | Minz ............... 204/98 |

FOREIGN PATENT DOCUMENTS 0972897  2/1962  United Kingdom .

OTHER PUBLICATIONS

J. Seidl, *Macroporous styrene/divinylbenzene copolymers and their use in chromatography and for preparing ion exchangers*, Table of Contents. 1967.

*Primary Examiner*—Fred Zitomer
*Attorney, Agent, or Firm*—Sprung Horn Kramer & Woods

[57] ABSTRACT

Weakly basic anion exchangers of the poly(meth)acrylamide type which have been prepared by aminolysis of poly(meth)acrylonitrile or poly(meth)acrylate with polyamines of defined composition have an improved absorption capacity for sulphate ions and are suitable for selectively removing sulphate ions from aqueous liquids, in particular from sodium chloride brine and from waste waters.

8 Claims, No Drawings

PROCESS OF REMOVING SULFATE IONS FROM WATER WITH A POLY(METH)ACRYLAMIDE EXCHANGE RESIN

This application is a continuation of application Ser. No. 07/931,165, filed Aug. 17, 1992, now abandoned.

The invention relates to weakly basic anion exchangers of the poly(meth)acrylamide type having a high selective absorption capacity for sulphate ions, to a process for the preparation of these ion exchangers by aminolysis of poly(meth)acrylonitrile or poly(meth)acrylate with defined polyamines and to the use of these ion exchangers for removing sulphate ions from aqueous liquids, in particular from alkali metal salt solutions (sodium chloride brines) and from waste waters.

As is known, weakly basic anion exchangers of the poly(meth)acrylamide type can be prepared from crosslinked poly(meth)acrylonitrile or from crosslinked poly(meth)acrylate by aminolysis (=reaction with polyamines), amide groups (and in some cases—undesirably—carboxyl groups) being formed from nitrile or ester groups. The aminolysed products contain practically no more nitrile or ester groups.

Polyamines which contain at least one primary amino group per molecule are in general employed for the aminolysis. The amide groups formed during the aminolysis are not capable of ion exchange, but the primary, secondary and tertiary amino groups which remain are available for this purpose.

The use of such weakly basic anion exchangers of the poly(meth)acrylamide type for removing sulphate ions from aqueous solutions (sea water, salt water, untreated water) is known, for example, from German Offenlegungsschrift 36 03 602; this specification recommends, for example, the product A 374 (incorrectly: "from Duolite"; correctly: "Product Duolite A 374" from Diaprosim, now Rohm and Haas) and the product IRA 60 (correctly: "Amberlite IRA 60") from Rohm and Haas (column 2, lines 10–13). Although these products are in principle suitable for the stated purpose, in the presence of chloride ions they have a sulphate ion absorption capacity which it would be entirely desirable to increase further.

Surprisingly, it has been found that anion exchangers having an increased sulphate ion absorption capacity from solutions containing chloride ions can be prepared by aminolysis of crosslinked poly(meth)acrylonitrile and/or crosslinked poly(meth)acrylate with polyamines if selected polyamines are employed for the aminolysis.

The invention thus relates to a process for the preparation of weakly basic anion exchangers of the poly(meth)acrylamide type having polyamino groups by aminolysis of poly(meth)acrylonitrile and/or poly(meth)acrylate with a polyamine, characterised in that the polyamine a) contains 4 to 8, preferably 4 or 5, N atoms per molecule,
b) carries at least 1 primary amino group per molecule and
c) contains an amount of heterocyclic isomer below a value of $$x = 100 - (A \times B^{n-4}) \; [\%]$$

wherein

A denotes 70 to 99, preferably 75 to 97, and in particular 80 to 95,

B denotes 0.7 to 0.9 and n denotes the number of N atoms per molecule.

The term "poly(meth)acrylonitrile and/or poly(meth)acrylate" is understood as meaning poly(meth)acrylonitriles, poly(meth)acrylic acid esters, their mixtures and their copolymers having a mixing ratio or a copolymerisation ratio of (0 to 100):(100 to 0), based on parts by weight.

Ethylenically unsaturated copolymerisable monomers which are preferred for the preparation of poly(meth)acrylonitrile and poly(meth)acrylate include acrylonitrile, methacrylonitrile and esters of the formula $CH_2=CHR^1-COOR^2$ wherein $R^1$ denotes hydrogen or methyl and $R^2$ denotes a $C_1-C_8$-hydrocarbon radical, preferably an aliphatic, cycloaliphatic, araliphatic or aromatic radical having up to 8 C atoms. Examples of such esters include the methyl, ethyl, isopropyl, n-, iso- and tert-butyl, n-, sec- and tert-amyl, n-octyl, 2-ethylhexyl, cyclohexyl, benzyl and phenyl esters of acrylic acid and methacrylic acid; methyl and ethyl acrylate and methacrylate are particularly preferred.

Both the poly(meth)acrylonitriles and the poly(meth)acrylates can contain copolymerised units of non-crosslinking "other" ethylenically unsaturated monomers, such as, for example, styrene, ethylstyrene, vinyltoluene, vinyl acetate, butadiene or chloroprene, the amount of these copolymerised units usually not exceeding 10% by weight, based on the total amount of all the polymerised units of non-crosslinking monomers.

The poly(meth)acrylonitriles and poly(meth)acrylates are crosslinked—preferably by copolymerisation with cross-linking monomers having more than one copolymerisable C=C double bond per molecule. Such crosslinking monomers include, for example, polyfunctional vinyl aromatics, such as di- and trivinylbenzenes, divinylethylbenzene, divinyltoluene and divinylnaphthalene, polyfunctional allyl aromatics, such as di- and triallylbenzenes, polyfunctional vinyl- and allyl-heterocyclic compounds, such as trivinyl and triallyl cyanurate and isocyanurate, N,N'-$C_1$-$C_6$-alkylenediacrylamides and -dimethacrylamides, such as N,N'-methylenediacrylamide and -dimethacrylamide and N,N'-ethylenediacrylamide and -dimethacrylamide, polyvinyl and polyallyl ethers of saturated $C_2$-$C_{20}$-polyols having 2 to 4 OH groups per molecule, such as, for example, ethylene glycol divinyl and diallyl ether and diethylene glycol divinyl and diallyl ether, esters of unsaturated $C_3$-$C_{12}$-monocarboxylic acids and unsaturated monohydric $C_3$-$C_{12}$-alcohols or saturated $C_2$-$C_{20}$-polyols having 2 to 4 OH groups per molecule, such as allyl methacrylate, ethylene glycol di(meth)acrylate, glycerol tri(meth)acrylate and pentaerythritol tetra(meth)acrylate, divinylethyleneurea, divinylpropyleneurea, divinyl adipate and aliphatic and cycloaliphatic olefins having 2 or 3 isolated C=C double bonds, such as 1,5-hexadiene, 1,5-dimethylhexadiene, 1,7-octadiene and trivinylcyclohexane. Divinylbenzene and mixtures of divinylbenzene and aliphatic $C_6$-$C_{12}$-hydrocarbons having 2 or 3 C=C double bonds have proved to be particularly suitable crosslinking monomers. The crosslinking monomers are in general employed in amounts of 2 to 20% by weight, preferably 2 to 12% by weight, based on the total amount of monomers employed.

The polymerisation is usually carried out by the suspension polymerisation process in the presence of a free radical initiator, such as benzoyl peroxide or an azo compound, for example azo-bis-isobutyronitrile, in the temperature range from 20° to 120° C. using customary suspension stabilisers.

Micro- and macroporous bead polymers can be employed. The macroporous bead polymers can be prepared by adding porogenic agents, such as are described, for example, by Seidl et al., Adv. Polym. Sci., Vol. 5 (1967), pages 113–213, for example aliphatic hydrocarbons, alcohols, esters, ethers, ketones, trialkylamines or nitro compounds, preferably isododecane, methyl isobutyl ketone or methylisobutylcarbinol, to the monomer mixture in amounts of 1 to 100, preferably 10 to 50% by weight, in particular 3 to 20% by weight, based on the total monomer.

The glass transition temperatures of the crosslinked poly(meth)acrylonitriles and the crosslinked poly(meth)acrylates (before the aminolysis) are in general in the range from 60° to 200°, preferably 100° to 170° C.

Examples of possible polyamines for the aminolysis are triethylenetetramine, tetraethylenepentamine, pentaethylenehexamine and their N-methyl and N-ethyl derivatives, the maximum degree of methylation or ethylation on the N atoms being to the extent that a primary amino group remains. The polyamines can be employed in technical quality as long as they comply with features a) to c); otherwise, they must be prepurified. In detail, the limit value x for the content of heterocyclic isomers is preferably

| for triethylenetetramine: | 25% | |
|---|---|---|
| for tetraethylenepentamine: | 35% | and |
| for pentaethylenehexamine: | 50%. | |

The polyamines are employed in excess, based on the groups to be aminolysed; preferably in amounts of 1.1 to 8, in particular 2 to 6 mol of polyamine per mole of nitrile or ester groups. The aminolysis can be carried out at temperatures from 120° to 250° C., preferably from 130° to 200° C. The reaction time is in general chosen such that the nitrile and ester groups are reacted quantitatively; the yield of amide groups which can be achieved is at least 80, preferably at least 90%, in particular at least 95% (the remainder is converted into carboxyl groups). In case of aminolysis of crosslinked poly(meth)acrylonitriles, the bead polymer is preferably suspended in aliphatic hydrocarbons, for example in isododecane, and the corresponding polyamine and water are then added—in an amount of up to 25% by weight, based on the amount of polyamine.

The anion exchangers prepared according to the invention are particularly suitable for absorbing sulphate ions selectively from aqueous solutions containing chloride ions.

The invention therefore furthermore relates to weakly basic anion exchangers of the poly(meth)acrylamide type having polyamino groups having a sulphate ion absorption capacity of at least 48, preferably at least 53 and in particular at least 60 g of sulphate per kg of anion exchanger (dry, based on the OH form and measured on an aqueous solution of 100 g of sodium chloride and 4.5 g of sodium sulphate (anhydrous) per liter of solution; flow rate: 5 bed volumes per hour at 25° C.). The upper limit of sulphate ion absorption capacity depends on the type of polyamine and on the type of base polymer; it can be, for example, up to 180 g of sulphate per kg of anion exchanger.

It seems particularly surprising that the effect associated with the invention is so pronounced, because it is to be assumed that the number of groups capable of anion exchange is not changed by the process measure according to the invention.

Finally, the invention furthermore relates to the use of these anion exchangers for removing sulphate ions from aqueous liquids containing chloride ions, in particular from sodium chloride brines and from waste waters.

The percentage data in the following examples are percentages by weight; parts are parts by weight.

EXAMPLES

Comparison I 129 ml of the anion exchanger, purified by charging twice with hydrochloric acid, Amberlite IRA 60 (content of weakly basic groups: 361 mmol per 129 ml) or 180 ml of Duolite A 374 (content of weakly basic groups: 360 mmol per 180 ml) in the free base form were suspended in 100 ml of aqueous sodium chloride solution (1000 g of NaCl/liter of solution) in a glass beaker and converted into the salt form by dropwise addition of 3N hydrochloric acid until the suspension had a pH of 3.

After the suspension had been transferred to a filter tube, an aqueous sodium chloride solution (100 g of NaCl/liter of solution, brought to a pH of 3 with hydrochloric acid) was filtered over the exchanger at a rate of 5 bed volumes per hour until the pH values of the feed and discharge coincided.

An aqueous sodium chloride solution containing sodium sulphate (100 g of NaCl+4.5 g of $Na_2SO_4$ (anhydrous) per liter of solution, pH=3) was then filtered over the exchanger at a rate of 5 bed volumes per hour at 25° C. until the sulphate concentrations of the feed and discharge coincided. During this operation, the discharge was divided into fractions of 100 ml; the sulphur content and pH in these fractions were determined. The sulphate adsorption was calculated from the total amount of the feed, the discharge and the associated sulphur contents, taking into account the interstitial volume subsequently measured (interspace volume).

According to the results, Duolite A 374 absorbs 17.1 g of sulphate and IRA 60 absorbs 22.75 g of sulphate per kg of exchanger (dry, in the free base form).

Example 1

A. Synthesis of the Bead Polymer 1081 g of methyl acrylate, 146 g of isododecane (pore-forming agent), 96.7 g of divinylbenzene (62.8% pure, remainder ethylstyrene; crosslinking agent), 36.4 g of 1,7-octadiene (crosslinking agent) and 8.1 g of dibenzoyl peroxide (75% pure) are initially introduced into a 3 l reaction vessel. After the mixture has been stirred for 15 minutes, the aqueous phase containing 1500 ml of completely desalinated water and 2.25 g of methylcellulose is added. The mixture is heated to 64° C. and stirred at this temperature for 5 hours, and is then heated to 90° C. and stirred at this temperature for a further 2 hours. After cooling, the bead polymer is filtered off, washed with water and dried.

B. Aminolysis of the Bead Polymer 1. 250 g of dry bead polymer from stage A are initially introduced into a 4 l four-necked flask. 2028 g of triethylenetetramine of the following composition are added:

| | |
|---|---|
| Isomer 1 | 81% |
| H₂N—CH₂—CH₂—NH—CH₂—CH₂—NH—CH₂—CH₂—NH₂ | |
| Isomer 2 | 3% |
| H₂N—CH₂—CH₂—N⟨piperazine⟩N—CH₂—CH₂—NH₂ | |
| Isomer 3 | 16% |
| H₂N—CH₂—CH₂—NH—CH₂—CH₂—N⟨piperazine⟩NH | |

The mixture is heated to 180° C. in the course 2.25 hours and stirred at this temperature for 20 hours. After cooling, the liquid phase is filtered off with suction and the resin is introduced into water. Yield: 1260 ml Content of primary and secondary amino groups: 3.96 mol/l Content of carboxyl groups: 0.13 mol/l 2. Comparison Process B1 is repeated with 2028 g of triethylenetetramine of the following composition:

| | |
|---|---|
| Isomer 1 | 58% |
| H₂N—CH₂—CH₂—NH—CH₂—CH₂—NH—CH₂—CH₂—NH₂ | |
| Isomer 2 | 14% |
| NH₂—CH₂—CH₂—N⟨piperazine⟩N—CH₂—CH₂—NH₂ | |
| Isomer 3 | 14% |
| HN⟨piperazine⟩N—CH₂—CH₂—NH—CH₂—CH₂—NH₂ | |
| Isomer 4 various other N-alkylated piperazines | 7% |
| Isomer 5 N(—CH₂—CH₂—NH₂)₃ | 7% |

Yield: 1297 ml Content of primary and secondary amino groups: 3.52 mol/l Content of carboxyl groups: 0.188 mol/l 3. Comparison Process B1 is repeated with 2963 g of N-aminoethylpiperazine. Yield: 2400 ml; Content of primary and secondary amino groups: 3.23 mol/l Content of carboxyl groups: 0.21 mol/l.

C. Determination of the Sulphate Absorption Capacity

The ion exchangers prepared according to B were treated as described in Comparison I and the absorption capacity for sulphate was then determined using the aqueous sodium chloride solution containing sulphate ions (composition as in Comparison I). The results are as follows:

| | Resin B1 | Resin B2 | Resin B3 |
|---|---|---|---|
| Amount of purified [ml] | 94 | 110 | 108 |
| anion exchanger in [mmol] free base form | 363 | 363 | 358 |
| Absorption of sulphate | | | |
| per liter of ion exchanger (OH form): | 26.65 g | 20.05 g | 10.5 g |
| per kg of ion exchanger (OH form): | 63.45 g | 47.74 g | 25 g |

We claim:

1. A method for removing sulphate ions from a sulphate ion-containing aqueous liquid which comprises contacting said liquid with a weakly basic poly(meth)acrylamide porous anion exchanger having polyamino groups having sulphate ion absorption capacity of at least 48 g of sulphate per kg of anion exchanger (dry, based on the OH form and measured on an aqueous solution of 100 g of sodium chloride and 4.5 g of sodium sulphate per liter of solution; flow rate: 5 bed volumes per hour at 25° C.), the exchanger having been produced by aminolysis of poly(meth)acrylate resin with a polyamine which a) contains 4 to 8N atoms per molecule,
b) carries at least i primary amino group per molecule and
c) contains an amount of heterocyclic isomer below a value of $$x = 100 - (A \times B^{n-4}) \ [\%]$$

wherein

A denotes 70 to 99,
B denotes 0.7 to 0.9 and
n denotes the number of N atoms per molecule.

2. The method according to claim 1, wherein the aqueous liquid additionally contains chloride ions, the sulphate ions being preferentially removed.

3. The method according to claim 1, wherein the aqueous liquid is a sodium chloride brine or waste water, also containing sulphate ions.

4. The method according to claim 1, wherein A is 75 to 97.

5. The method according to claim 1, wherein A is 80 to 95.

6. The method according to claim 1, wherein the polyamine contains 4 or 5N atoms per molecule.

7. The method according to claim 1, wherein the polyamine is employed in an amount of 1.1 to 8 mole per mole of ester groups.

8. The method according to claim 1, wherein the exchanger has a sulphate ion absorption capacity of at least 53 g per kg of anion exchanger (based on the OH form, dry).

* * * * *